United States Patent
Shah et al.

(10) Patent No.: US 12,503,413 B2
(45) Date of Patent: Dec. 23, 2025

(54) HEATING INTEGRATION WITH FIRED HEATERS

(71) Applicant: UOP LLC, Des Plaines, IL (US)

(72) Inventors: Chintan Surendra Shah, Haryana (IN); Manoj Kumar, Haryana (IN); Pankaj Kumar Singh, Buffalo Grove, IL (US); Amit Munjal, Haryana (IN)

(73) Assignee: UOP LLC, Des Plaines, IL (US)

( * ) Notice: Subject to any disclaimer, the term of this patent is extended or adjusted under 35 U.S.C. 154(b) by 55 days.

(21) Appl. No.: 18/497,301

(22) Filed: Oct. 30, 2023

(65) Prior Publication Data

US 2025/0136531 A1    May 1, 2025

(51) Int. Cl.
*C07C 5/22*    (2006.01)

(52) U.S. Cl.
CPC ............ *C07C 5/22* (2013.01); *C07C 2601/16* (2017.05)

(58) Field of Classification Search
CPC ....... C07C 5/22; C07C 2601/16; B01D 3/007; B01D 3/322
See application file for complete search history.

(56) References Cited

U.S. PATENT DOCUMENTS

| | | |
|---|---|---|
| 7,718,049 B2 | 5/2010 | Strack et al. |
| 8,535,516 B2 | 9/2013 | Ward et al. |
| 10,899,987 B2 | 1/2021 | Prim |
| 11,473,499 B2 | 10/2022 | Mokheimer et al. |
| 11,617,986 B2 | 4/2023 | Alekseev |
| 2022/0219097 A1 | 7/2022 | Hoehn et al. |
| 2022/0380685 A1 | 12/2022 | Wu et al. |

FOREIGN PATENT DOCUMENTS

| | | | |
|---|---|---|---|
| CN | 203923054 U | 11/2014 | |
| CN | 206680191 U | 11/2017 | |
| CN | 211177621 U | 8/2020 | |
| CN | 217661593 U | 10/2022 | |
| KR | 20160133829 A | * 11/2016 | ............... C07C 7/04 |

OTHER PUBLICATIONS

KR 20160133829 A English Translation (Year: 2016).*
International Search Report from corresponding PCT application No. PCT/US2024/052304, mailed Jan. 31, 2025.
Written Opinion from corresponding PCT application No. PCT/US2024/052304, mailed Jan. 31, 2025.
S.O. Mert et al., Performance Assessment of a Batch Distillation System, International Journal of Thermodynamics, vol. 18 (No. 2), pp. 143-148, Jun. 2015.

* cited by examiner

*Primary Examiner* — Thuan D Dang

(57) ABSTRACT

Processes integrating electric heaters or other heating sources for heating of liquid and two phase hydrocarbon streams resulting in reduced $CO_2$ emissions are described. The processes shift a portion of the fired heater duty to an electric heater or other heat source. All or a portion of a vapor stream from a two phase separator is heated or superheated by an electric heater or other heat source to provide sufficient temperature that the heated/superheated vapor stream acts as a heat source to a bottom or side draw stream from a column. The preheated bottom or side draw stream is sent to the fired heater.

15 Claims, 8 Drawing Sheets

HEATING INTEGRATION WITH FIRED HEATERS

BACKGROUND

The worldwide concern over global warming and the goal of various countries to reduce their $CO_2$ footprint and/or to become carbon neutral is challenging industries to come up with cleaner, more environmentally friendly processes. One way to make an overall process involving hydrocarbon streams more environmentally friendly is to maximize usage of green electricity for heating purposes. However, electric heating is not widely used to heat liquid hydrocarbon and two phase (liquid hydrocarbon and vapor hydrocarbon) streams currently due to the potential for coking, thermal cracking, and/or fouling by the liquid hydrocarbon. Instead, fired heaters are used to achieve process unit objectives for fractionation including, but not limited to, bottom reboiling, column side draw heating/reboiling, column feed preheating, two phase heaters, and the like. The fired heaters are used in a variety of technologies, including but not limited to hydrotreating naphtha, diesel, kerosene, and like, reforming, isomerization, hydroprocessing, hydrocracking, low sulfur processing, production of renewable diesel and jet fuel, dehydrogenation processes, xylene fractionation, aromatics separation processes, transalkylation, and the like.

Therefore, there is need for hydrocarbon processes which have a reduced $CO_2$ footprint.

DESCRIPTION

Figure 1:
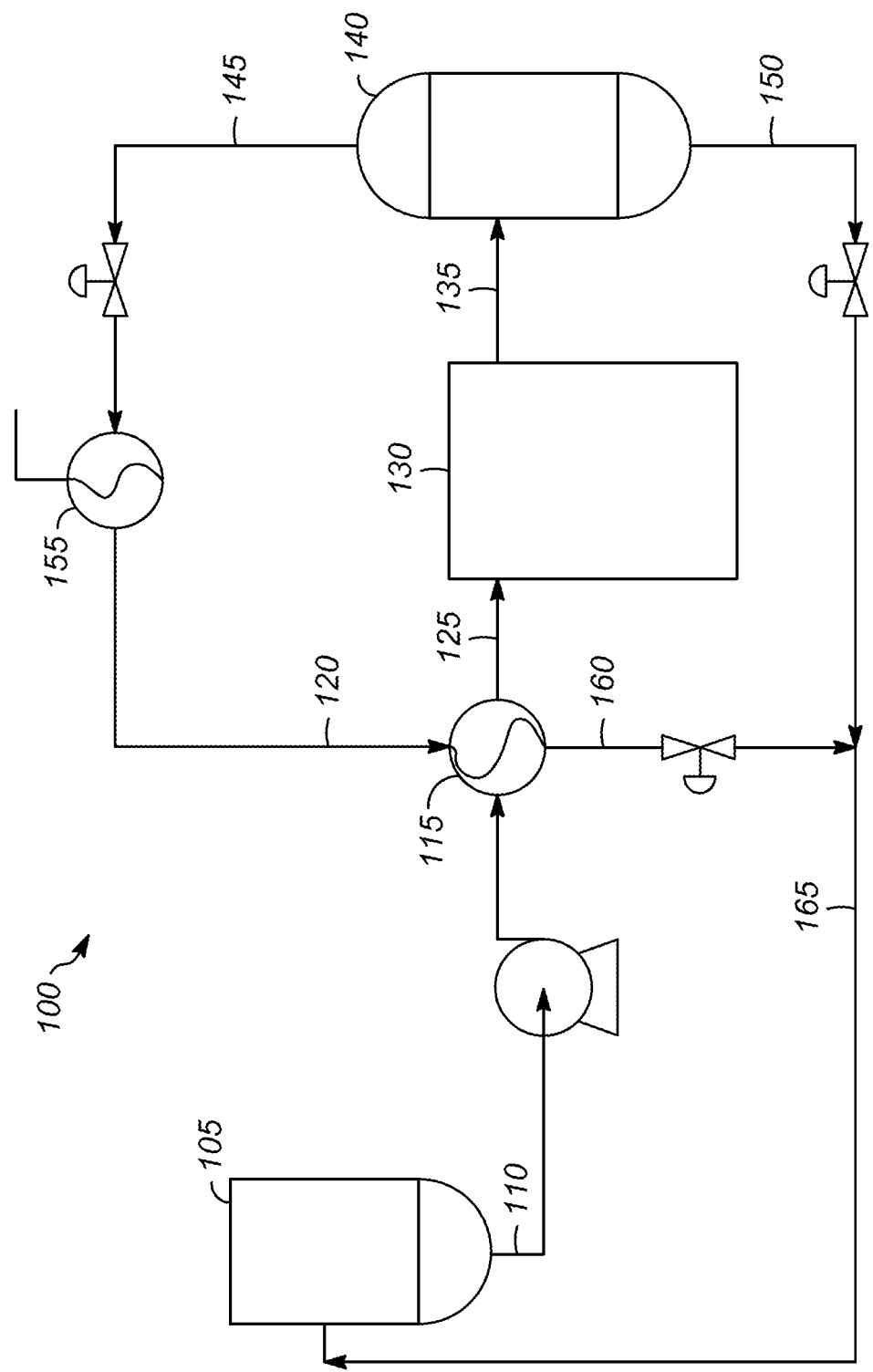
FIG. 1 is an illustration of one embodiment of a process involving the integration of a reboiler fired heater and a heater.

The present invention relates to processes involving the heating of liquid and two phase (liquid hydrocarbon and vapor hydrocarbon) hydrocarbon streams. The processes integrate electric heaters or other heating sources such as steam and/or hot water, hot oil, another hotter hydrocarbon stream (vapor, liquid, or two phase), and like, with any all-liquid or two phase fired heaters. The heat integration scheme provides a reduction in $CO_2$ emissions and makes the overall process greener. The processes permit the integration of electric heaters in reboiler or two phase services without the concerns of coking, thermal cracking, and/or fouling by the liquid hydrocarbon. It also results in reduced fuel consumption, and reduced size of the fired heater, leading to plot space savings. This process can be applied to any heater which has two phases at the fired heater outlet.

The process shifts a portion of the fired heater duty to an electric heater or other heat source. There can be one or more electric heaters (or other heater source as described above) in series and/or in parallel to achieve the desired heating. All or a portion of a vapor stream from a two phase separator is heated by an electric heater or other heater source (or multiple electric heaters or other sources in series and/or in parallel) to a requisite temperature which may vary among different processes and the desired objectives. For example, the requisite temperature for a reboiling stream will be the temperature required to achieve a targeted percentage of vapor to facilitate fractionation column operation. If the heat integration is in column feed, then the temperature can be the desired temperature to achieve particular technology's stream properties feeding to the column. Suitable temperatures are be determined by those of skill in the art based on the particular process, and the streams involved. The heated vapor stream exchanges heat with an incoming liquid hydrocarbon stream from a column (a column bottom stream, a column side draw stream, or both), increasing the fired heater inlet temperature and resulting in a reduction in the fired heater duty.

The process involves heating or superheating a vapor stream downstream of a two phase separator to a targeted temperature to provide a sufficient temperature that the heated/superheated vapor stream acts as a heat source to a targeted service where this was not possible previously because the fired heater reboiler outlet temperature was constrained by the operating temperature and pressure of the column.

By incorporating the heat integration, the fired heater duty and the size of the fired heater are reduced, resulting in a reduction in the fuel consumption and $CO_2$ emissions of the process. Furthermore, the footprint of the heaters is reduced, leading to capital cost reductions, as well as reduced pressure drop across the fired heaters due to the reduction of the individual duties. This will help to offset the pressure drop due to the additional equipment in form of heat exchangers (other heaters) and electric heaters. If the customer is switching to 100% hydrogen fuel, the integration and reduced fired heater duty gives customer flexibility to consume lesser hydrogen as fuel, which in turn reduces operating expenses and facilitates achieving the net zero goal.

The heat integration scheme paves way to heat integrate multiple heater services and to transition to a green electricity based heating scheme. Incorporating multiple heater services offers even greater benefits than replacing charge heaters with electric heaters, while offering low capital and operating costs.

The liquid bottom or side draw stream from a column is sent to a heat exchanger where it exchanges heat with a vapor stream, increasing the temperature of the bottom or side draw stream. The preheated bottom or side draw stream can be only liquid or liquid and vapor, depending on the particular process and streams involved. The preheated bottom or side draw stream is sent to the fired heater for further heating and/or phase change (reboiling). The fired heater duty is reduced because of the preheating of the column bottom or side draw stream in the heat exchanger.

The heated bottom or side draw stream downstream of the fired heater is separated in a two phase separator into a vapor stream and a liquid stream.

In some embodiments, the vapor stream is heated before being sent to the heat exchanger to preheat the bottom stream.

The cooled stream from the heat exchanger is combined with the liquid stream from the two phase separator and returned to the column at a point above where the bottoms stream exits from the column.

The vapor stream from the two phase separator can be split into multiple streams (two or more) downstream of two phase separator. The vapor stream can be heated/superheated with an electric heater (or other heat source) before or after the vapor stream is split. One or more of the vapor streams split from the vapor stream from the two phase separator can be heated/superheated with an electric heater (or other heat source).

When the vapor stream from the two phase separator is split, one of the streams can be mixed with the cooled stream from the heat exchanger and the liquid stream from the two phase separator and returned to the column.

The stream split from the vapor stream can be heated/superheated by electric heater (or other heat source), and all or a portion of the heated/superheated stream can act as a heat source for another process stream in same process unit or any other process unit. The remaining portion (or all of the stream) can be cooled in a cold sink and combined with the cooled stream from the heat exchanger and the liquid stream from the two phase separator and returned to the column.

The split stream may be hot enough to act as a heat source for a process stream without further heating. The split stream can be cooled in a cold sink and combined with cooled stream from the heat exchanger and the liquid stream from the two phase separator and returned to the column.

The vapor stream from the two phase separator can be split into two or more portions, such as three, four, five, or more. Two or more of the portions can be heated/superheated with an electric heater (or other heat source) and then heat exchanged with process streams. The cooled streams can be combined and used as the vapor stream to heat exchange with the bottom stream from the column. In some cases, a third portion of the vapor stream can be combined with the cooled streams and heat exchanged with the bottom stream.

Instead of preheating the bottom or side drawing stream with the vapor stream in a heat exchanger, all or a portion of the heated vapor stream can be directly mixed at the fired heater inlet with a liquid hydrocarbon stream to increase temperature of heater inlet stream, resulting in a stream having two phases entering the fired heater. This will also reduce the fired heater duty. The remaining portion (if any) of the heated vapor stream can be directly entered into a column bottom or at a tray/stage. There would be no heat exchanger in this process, and no cooled vapor stream.

The heat integration can be incorporated into any hydrocarbon process including a column and a fired heater. Suitable hydrocarbon processes include, but are not limited to, hydrotreating, reforming, isomerization, hydroprocessing, hydrocracking, low sulfur processing, production of renewable diesel and jet fuel, dehydrogenation processes, xylene fractionation, aromatics separation processes, transalkylation, and the like.

In one specific example, it was determined that the fired duties for the naphtha splitter reboiler and naphtha stripper reboiler in a naphtha hydrotreater (NHT) process unit incorporating the heat integration process described can be reduced by over 30%. The vapor stream from the naphtha stripper reboiler heater, which is typically operating at reboiler outlet temperature of 200-250° C. from downstream of the two phase separator, can be routed to an electric heater or other heat source where the reboiler vapor stream is heated to a higher temperature (for example, in the range of 399-427° C.). The portion of the heated vapor stream can be utilized as a heat source for NHT charge (feed) preheating to reduce the NHT charge heater fired duty. Typically, in existing processes, the NHT charge downstream of a combined feed exchanger is at a temperature of 250-315° C. depending on the quality of the naphtha. Thus, the stripper reboiler stream cannot preheat the NHT charge because the reboiler stream is at lower temperature. This limitation is removed with the current heat integration scheme. By heating/superheating the portion of naphtha stripper reboiler vapor stream to a targeted temperature, the temperature is sufficient to allow preheating the NHT charge with the reboiler vapor stream. Using the advanced heat integration of the present process for all three fired heaters in an NHT process unit, i.e., the NHT charge heater, the naphtha stripper reboiler heater, and the naphtha splitter reboiler heater, a fired duty reduction of 30% or more can be targeted.

In another specific example, the heat integration can be used in a combined isomerization and transalkylation process. The vapor stream from the two phase separator can be split into two streams (or multiple streams as required), with one part going to an isomerization charge heater and the other going to a transalkylation charge heater. The two streams are heated with electric heaters (or they can be heated with a common electric heater as well before splitting the streams) or other heat sources as described above. The heated vapor streams act as heat sources to the isomerization and transalkylation charge heaters, which are transitioned from fired heaters to heat exchangers. Any suitable type of heat exchangers can be used. Suitable heat exchangers include, but are not limited to, shell and tube heat exchangers, spiral tube heat exchangers, vertical combined feed exchangers, and specialty exchangers, such as plate bundle heat exchangers, e.g., CompaBloc, and Packinox available from Alfa Laval. After the exchange of heat in the isomerization and/or transalkylation charge heaters (exchangers), the vapor streams are quenched by mixing with the balance of the vapor stream from the two phase separator. The mixed stream, which is 100% quenched vapor, is routed to a heat exchanger downstream of a column bottom pump but upstream of the reboiler fired heater to preheat the column bottom or side draw stream which reduces the fired duty from the reboiler fired heater. Because the heat rejected from the isomerization and/or transalkylation charge heaters is still in the vapor stream even after preheating the reboiler fired heater feed, the fired reboiler heater duty is reduced further. The heat integration of the reboiler fired heater with the isomerization and/or transalkylation charge heaters can achieve over 40% decarbonization across the aromatics complex covering multiple process units.

For ease of discussion, the flow schemes are focused on a reboiler fired heater and the bottom stream from a column, but the heat integration can be applied for any two phase fired heater or a column side draw heater. Further, the electric heater could be replaced by any of the other heat sources, discussed above.

FIG. 1 illustrates the integration of a reboiler fired heater and an electric heater. In the process 100, the bottom stream 110 from a column 105 comprises a liquid stream.

The bottom stream is sent to a heat exchanger 115 where it is preheated by vapor stream 120. The preheated stream 125 is sent to a fired reboiler heater 130 where it is further heated.

The heated stream 135, which is a mixture of liquid and vapor, is sent to a two phase separator 140 where it is separated into vapor stream 145 and liquid stream 150.

The vapor stream 145 from the two phase separator 140 is further heated in electric heater 155 forming heated vapor stream 120. The heated vapor stream 120 is heat exchanged with bottom stream 110 from the column 105 in heat exchanger 115 forming cooled vapor stream 160 (the cooled vapor stream 160 can be a mixture of liquid and vapor or completely vapor).

The liquid stream 150 from the two phase separator 140 is combined with the cooled vapor stream 160 from the heat exchanger 115 forming a combined mixed stream 165. The combined mixed stream 165 is returned to the column 105 at a point above where the bottom stream 110 is removed.

Figure 2:
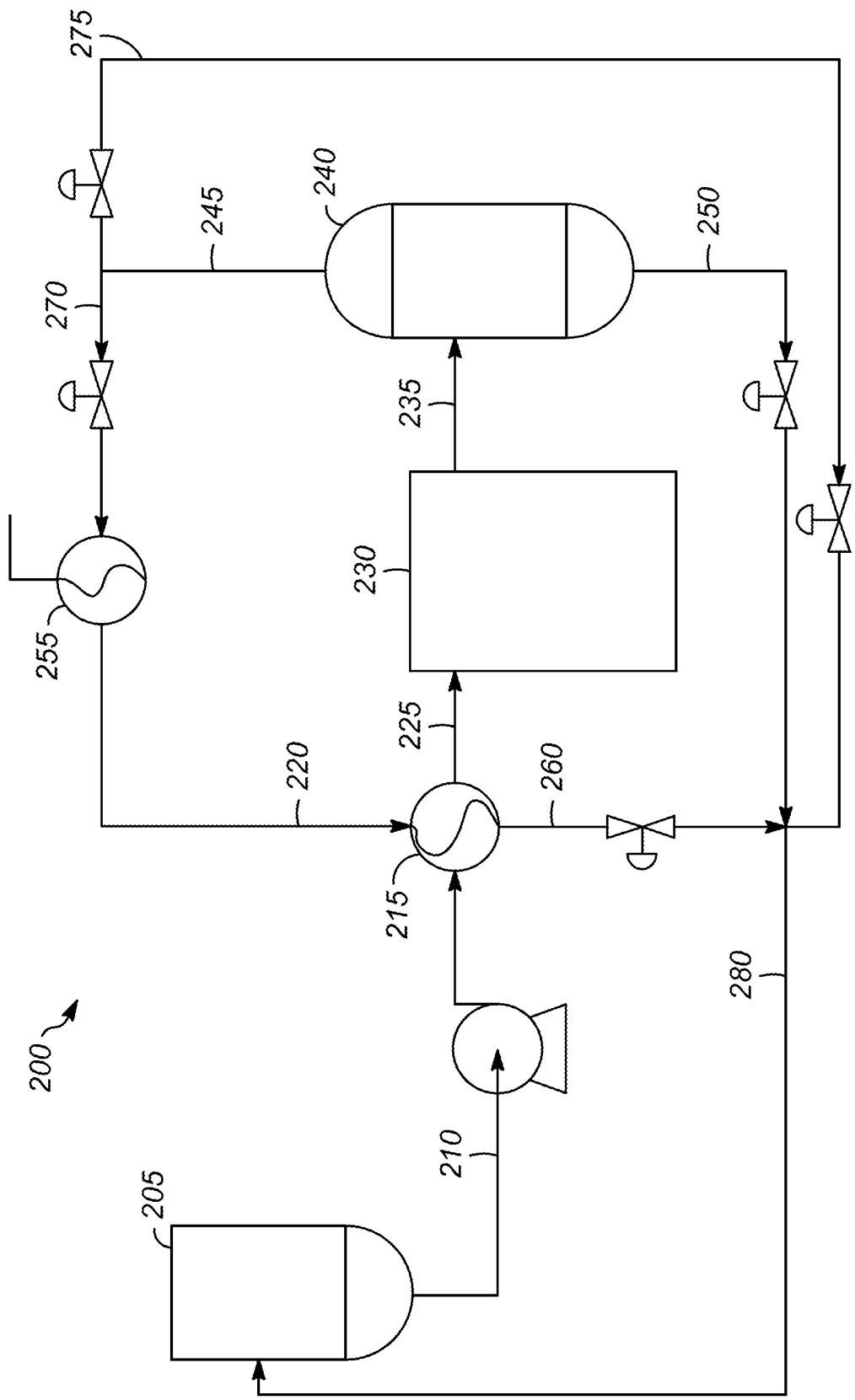
FIG. 2 is an illustration of another embodiment of a process involving the integration of a reboiler fired heater and a heater.

FIG. 2 illustrates another embodiment of the integration of a reboiler fired heater and an electric heater. In the process 200, the bottom stream 210 from a column 205 comprises a liquid stream.

The bottom stream is sent to a heat exchanger 215 where it is preheated by heated vapor stream 220. The preheated stream 225 is sent to a fired reboiler heater 230 where it is further heated.

The heated stream 235, which is a mixture of liquid and vapor, is sent to a two phase separator 240 where it is separated into vapor stream 245 and liquid stream 250.

The vapor stream 245 from the two phase separator 240 is split into vapor stream 270 and vapor stream 275.

The vapor stream 270 is further heated in electric heater 255 forming heated vapor stream 220. The heated vapor stream 220 is heat exchanged with bottom stream 210 from the column 205 in heat exchanger 215 forming cooled vapor stream 260 (the cooled vapor stream 260 can be a mixture of liquid and vapor or completely vapor).

The vapor stream 275 is combined with the liquid stream 250 from the two phase separator 240 and the cooled vapor stream 260 from the heat exchanger 215 forming a combined mixed stream 280. The combined mixed stream 280 is returned to the column 205 at a point above where the bottom stream 210 is removed.

Figure 3:
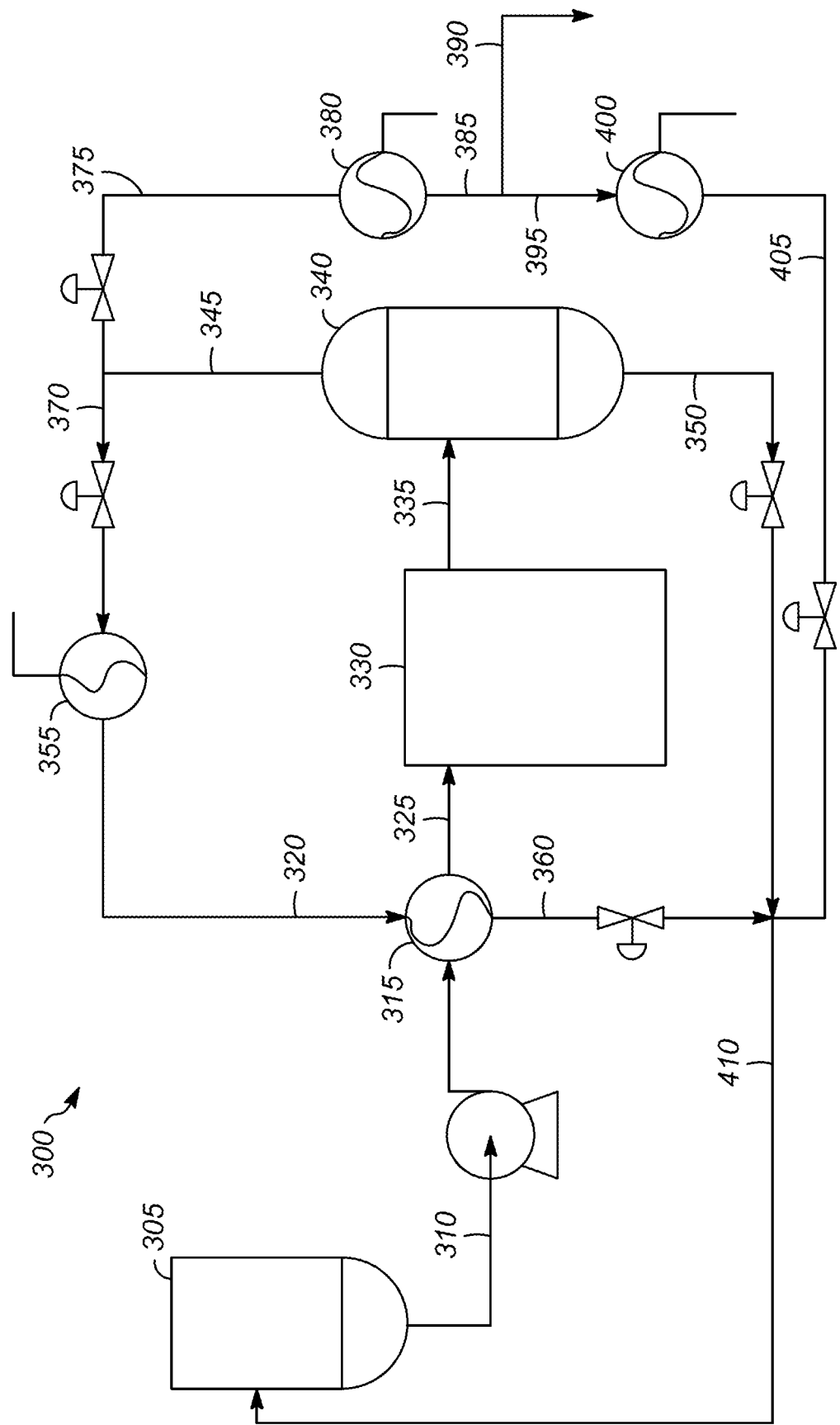
FIG. 3 is an illustration of still another embodiment of a process involving the integration of a reboiler fired heater and a heater.

FIG. 3 illustrates another embodiment of the integration of a reboiler fired heater and an electric heater. In the process 300, the bottom stream 310 from a column 305 comprises a liquid stream.

The bottom stream is sent to a heat exchanger 315 where it is preheated by heated vapor stream 320. The preheated stream 325 is sent to a fired reboiler heater 330 where it is further heated.

The heated stream 335, which is a mixture of liquid and vapor, is sent to a two phase separator 340 where it is separated into vapor stream 345 and liquid stream 350.

The vapor stream 345 from the two phase separator 340 is split into vapor stream 370 and vapor stream 375.

The vapor stream 370 is further heated in electric heater 355 forming heated vapor stream 320. The heated vapor stream 320 is heat exchanged with bottom stream 310 from the column 305 in heat exchanger 315 forming cooled vapor/liquid stream 360 (the cooled vapor/liquid stream 360 can be a mixture of liquid and vapor or completely vapor).

The vapor stream 375 is heated in a second electric heater 380 forming heated vapor stream 385. A portion 390 of the heated vapor stream 385 can be sent to other processes for use. The remainder 395 of the heated vapor stream 385 is cooled in cold sink 400 forming mixed stream 405. After heat exchange with another process stream (not shown), portion 390 can be sent to a cold sink (a second cold sink or cold sink 400) and combined with mixed stream 405.

The mixed stream 405 is combined with the liquid stream 350 from the two phase separator 340 and the cooled vapor/liquid stream 360 from the heat exchanger 315 forming a combined mixed stream 410. The combined mixed stream 410 is returned to the column 305 at a point above where the bottom stream 310 is removed.

Figure 4:
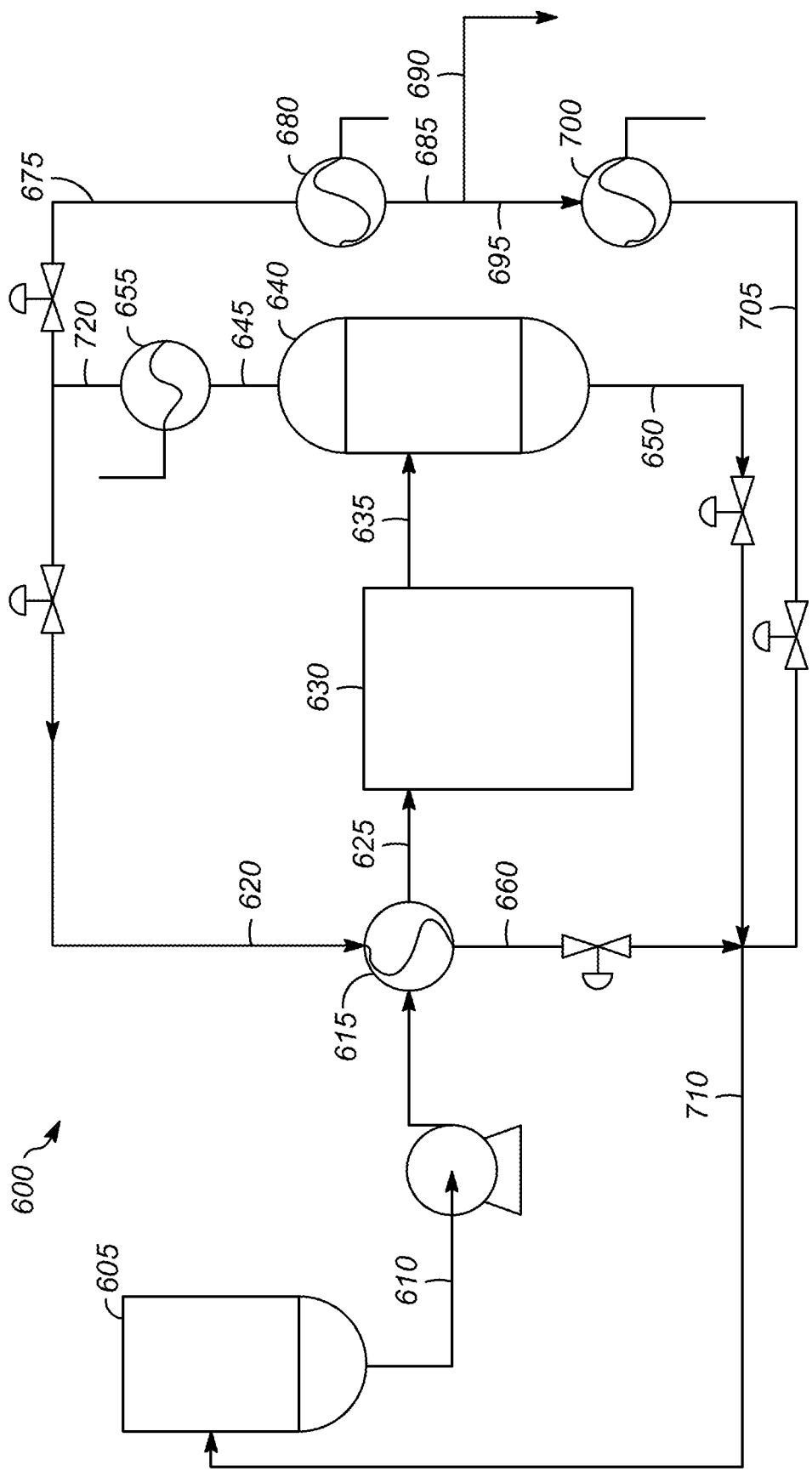
FIG. 4 is an illustration of yet another embodiment of a process involving the integration of a reboiler fired heater and a heater.

FIG. 4 illustrates another embodiment of the integration of a reboiler fired heater and an electric heater. In the process 600, the bottom stream 610 from a column 605 comprises a liquid stream.

The bottom stream is sent to a heat exchanger 615 where it is preheated by vapor stream 620. The preheated stream 625 is sent to a fired reboiler heater 630 where it is further heated.

The heated stream 635, which is a mixture of liquid and vapor, is sent to a two phase separator 640 where it is separated into vapor stream 645 and liquid stream 650.

The vapor stream 645 from the two phase separator 640 is heated in electric heater 655 forming heated stream 720 before being split into vapor stream 620 and vapor stream 675.

The vapor stream 620 is heat exchanged with bottom stream 610 from the column 605 in heat exchanger 615 forming cooled vapor/liquid stream 660 (the cooled vapor/liquid stream 660 can be a mixture of liquid and vapor or completely vapor).

The vapor stream 675 is heated in a second heater 680 forming heated vapor stream 685. A portion 690 of the heated vapor stream 685 can be sent to other processes for use. The remainder 695 of the heated vapor stream 685 is cooled in cold sink 700 forming mixed stream 705. After heat exchange with another process stream (not shown), portion 690 can be sent to a cold sink (a second cold sink or cold sink 700) and combined with mixed stream 705.

The mixed stream 705 is combined with the liquid stream 650 from the two phase separator 640 and the cooled vapor/liquid stream 660 from the heat exchanger 615 forming a combined mixed stream 710. The combined mixed stream 710 is returned to the column 605 at a point above where the bottom stream 610 is removed.

Figure 5:
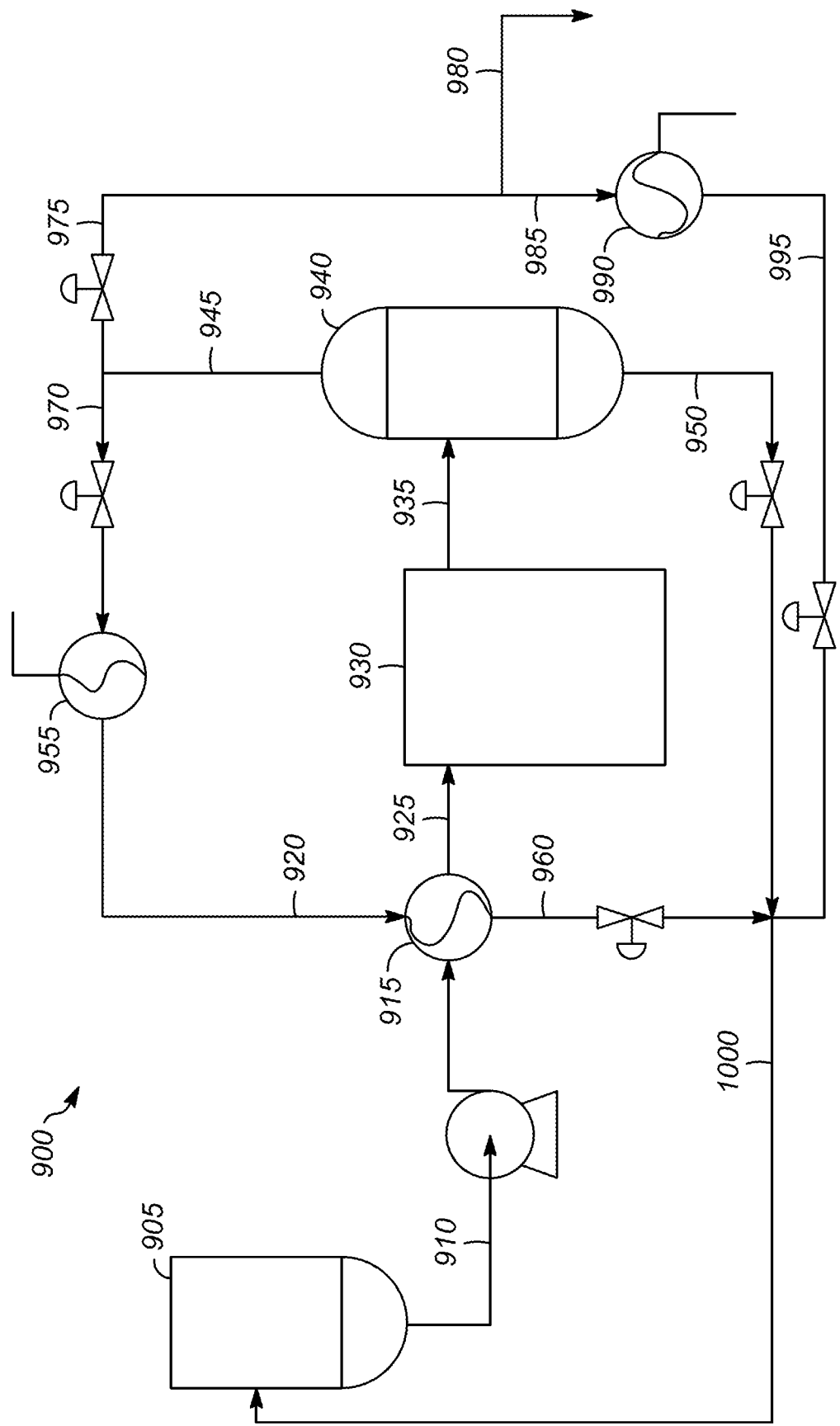
FIG. 5 is an illustration of another embodiment of a process involving the integration of a reboiler fired heater and a heater.

FIG. 5 illustrates another embodiment of the integration of a reboiler fired heater and an electric heater. In the process 900, the bottom stream 910 from a column 905 comprises a liquid stream.

The bottom stream is sent to a heat exchanger 915 where it is preheated by heated vapor stream 920. The preheated stream 925 is sent to a fired reboiler heater 930 where it is further heated.

The heated stream 935, which is a mixture of liquid and vapor, is sent to a two phase separator 940 where it is separated into vapor stream 945 and liquid stream 950.

The vapor stream 945 from the two phase separator 940 is split into vapor stream 970 and vapor stream 975.

The vapor stream 970 heated in heater 955 forming heated vapor stream 920. The heated vapor stream 920 is heat exchanged with bottom stream 910 from the column 905 in heat exchanger 915 forming cooled vapor/liquid stream 960 (the cooled vapor/liquid stream 960 can be a mixture of liquid and vapor or completely vapor).

A portion 980 of the vapor stream 975 can be sent to other processes for use. The remainder 985 of the vapor stream 975 is cooled in cold sink 990 forming mixed stream 995.

The mixed stream 995 is combined with the liquid stream 950 from the two phase separator 940 and the cooled vapor/liquid stream 960 from the heat exchanger 915 forming a combined mixed stream 1000. The combined mixed stream 1000 is returned to the column 905 at a point above where the bottom stream 910 is removed.

Figure 6:
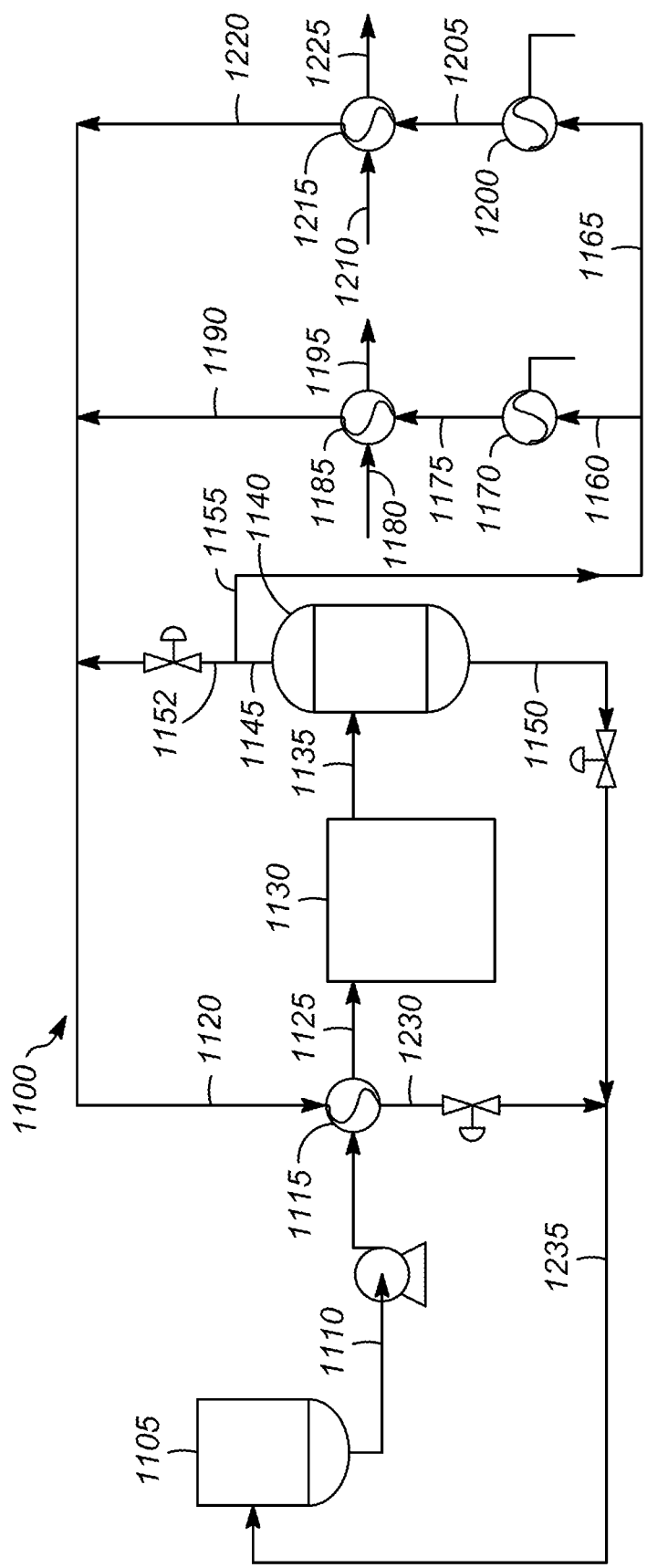
FIG. 6 is an illustration of another embodiment of a process involving the integration of a reboiler fired heater and a heater.

FIG. 6 illustrates another embodiment of the integration of a reboiler fired heater and an electric heater. In the process 1100, the bottom stream 1110 from a column 1105 comprises a liquid stream.

The bottom stream is sent to a heat exchanger 1115 where it is preheated by vapor stream 1120. The preheated stream 1125 is sent to a fired reboiler heater 1130 where it is further heated.

The heated stream 1135, which is a mixture of liquid and vapor, is sent to a two phase separator 1140 where it is separated into vapor stream 1145 and liquid stream 1150.

The vapor stream 1145 from the two phase separator 1140 split into vapor stream 1152 and vapor stream 1155.

The vapor stream 1155 is split into vapor stream 1160 and vapor stream 1165.

The vapor stream 1160 is heated in electric heater 1170 forming heated stream 1175. A process stream 1180 is heat exchanged with heated vapor stream 1175 in heat exchanger 1185 forming cooled vapor/liquid stream 1190 (the cooled vapor/liquid stream 1190 can be mixture of liquid and vapor or completely vapor) and preheated process stream 1195.

The vapor stream 1165 is heated in heater in a second electric heater 1200 forming a second heated vapor/liquid stream 1205. A second process stream 1210 is heat exchanged with the second heated vapor stream 1205 in the second heat exchanger 1215 forming a second cooled vapor/liquid stream 1220 (the second cooled vapor/liquid stream 1220 can be a mixture of liquid and vapor or completely vapor) and preheated process stream 1225.

Alternatively, electric heaters 1170 and 1200 can be replaced by a single electric heater, and the vapor stream 1155 can be heated in the single electric heater before being split into vapor streams 1160 and 1165. In this case, vapor streams 1160 and 1165 are hot enough to be heat exchanged with process streams 1180 and 1210.

The vapor stream 1152 from the two phase separator 1140, the cooled vapor/liquid stream 1190 from heat exchanger 1185, and the second cooled vapor/liquid stream 1220 from the second heat exchanger 1215 are combined to form vapor stream 1120.

The vapor stream 1120 is heated exchanged with the bottom stream 1110 from the column 1105 in heat exchanger 1115 forming cooled vapor/liquid stream 1230 (the cooled vapor/liquid stream 1230 can be a mixture of liquid and vapor or completely vapor).

The liquid stream 1150 from the two phase separator 1140 is combined with the cooled vapor/liquid stream 1230 from the heat exchanger 1115 forming a combined mixed stream 1235. The combined mixed stream 1235 is returned to the column 1105 at a point above where the bottom stream 1110 is removed.

Figure 7:
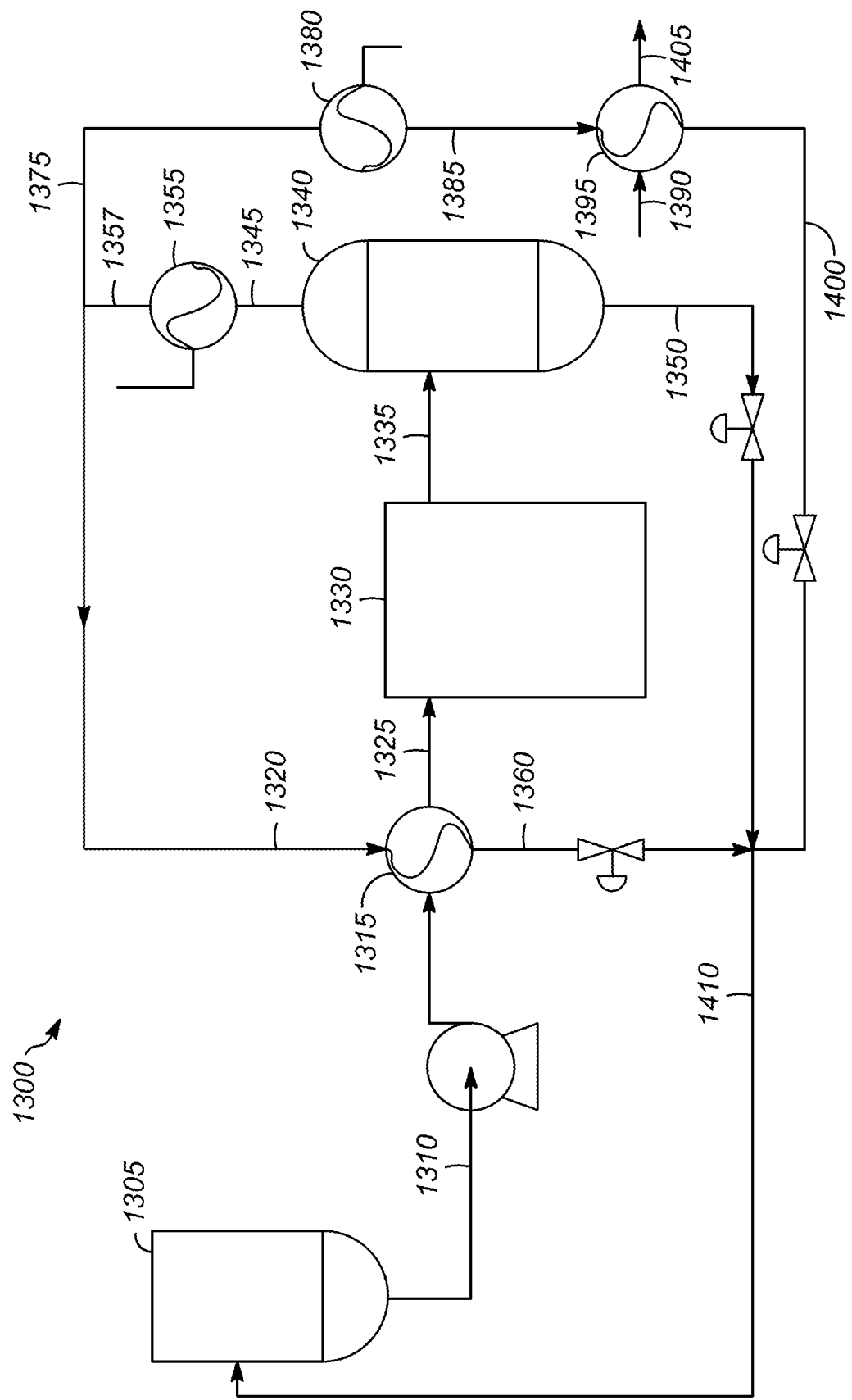
FIG. 7 is an illustration of another embodiment of a process involving the integration of a reboiler fired heater and a heater.

FIG. 7 illustrates another embodiment of the integration of a reboiler fired heater and an electric heater. In the process 1300, the bottom stream 1310 from a column 1305 comprises a liquid stream.

The bottom stream 1310 is sent to a heat exchanger 1315 where it is preheated by heated vapor stream 1320. The preheated stream 1325 is sent to a fired reboiler heater 1330 where it is further heated.

The heated stream 1335, which is a mixture of liquid and vapor, is sent to a two phase separator 1340 where it is separated into vapor stream 1345 and liquid stream 1350.

The vapor stream 1345 from the two phase separator 1340 is heated in electric heater 1355 forming heated vapor stream 1357.

The heated vapor stream 1357 is split into heated vapor stream 1320 and vapor stream 1375.

The heated vapor stream 1320 is heat exchanged with bottom stream 1310 from the column 1305 in heat exchanger 1315 forming cooled vapor/liquid stream 1360 (the cooled vapor/liquid stream 1360 can be a mixture of liquid and vapor or completely vapor).

The vapor stream 1375 is heated in a second electric heater 1380 forming heated vapor stream 1385.

A process stream 1390 is heat exchanged with heated vapor stream 1385 in heat exchanger 1395 forming cooled vapor/liquid stream 1400 (the cooled vapor/liquid stream 1400 can be a mixture of liquid and vapor) and preheated process stream 1405.

The cooled vapor/liquid stream 1400 is combined with the liquid stream 1350 from the two phase separator 1340 and the cooled vapor/liquid stream 1360 from the heat exchanger 1315 forming a combined mixed stream 1410. The combined mixed stream 1410 is returned to the column 1305 at a point above where the bottom stream 1310 is removed.

Figure 8:
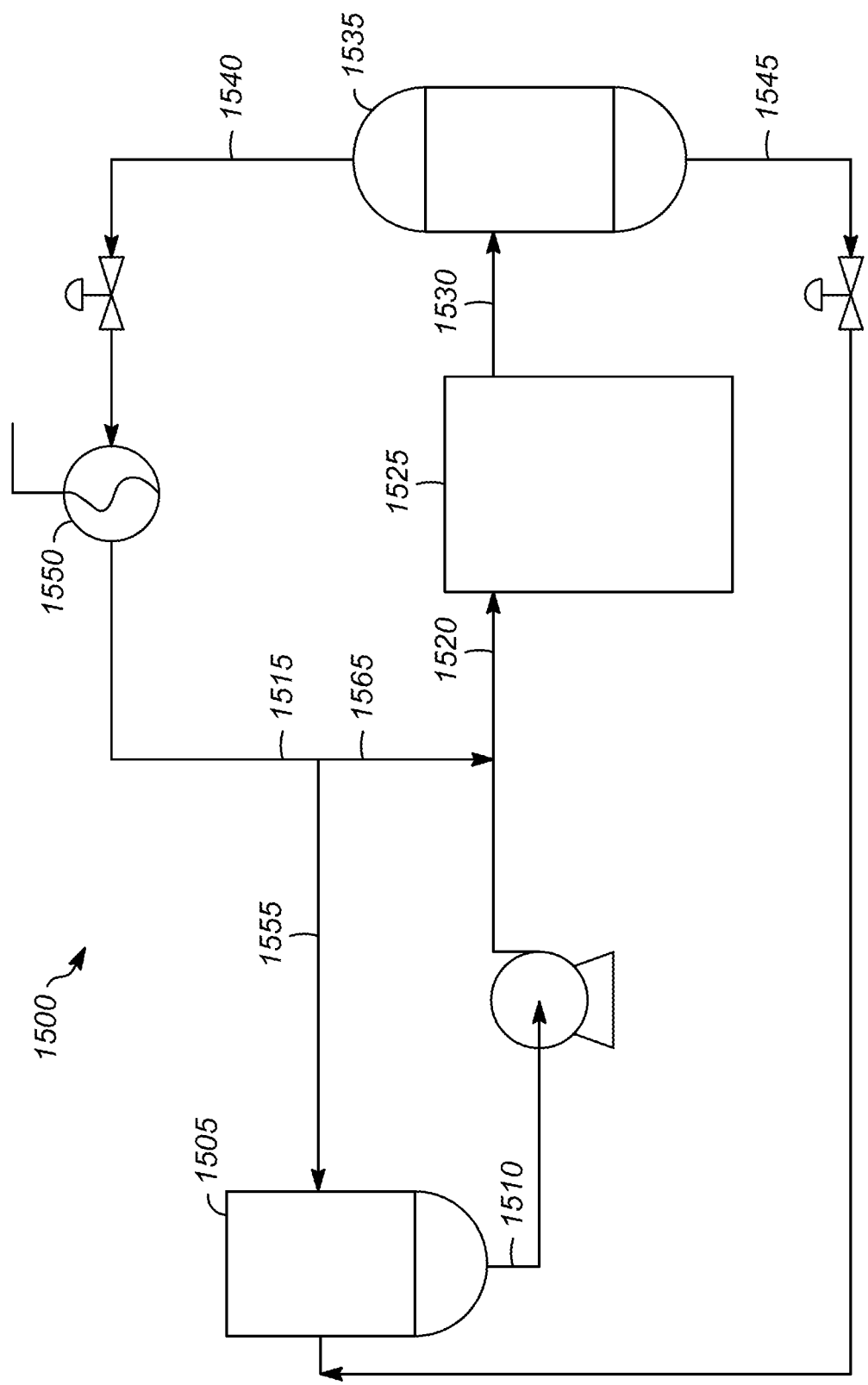
FIG. 8 is an illustration of another embodiment of a process involving the integration of a reboiler fired heater and a heater.

FIG. 8 illustrates the integration of a reboiler fired heater and an electric heater. In the process 1500, the bottom stream 1510 from a column 1505 comprises a liquid stream.

The bottom stream 1510 is mixed with a heated vapor stream 1515 forming a mixed stream 1520 comprising vapor and liquid and having a higher temperature than the bottom stream.

The mixed stream 1520 is sent to a fired reboiler heater 1525 where it is further heated. The higher inlet temperature of the mixed stream 1520 results in lower heat duty in the fired reboiler heater 1525.

The heated stream 1530, which is a mixture of liquid and vapor, is sent to a two phase separator 1535 where it is separated into vapor stream 1540 and liquid stream 1545.

The vapor stream 1540 from the two phase separator 1535 is further heated in electric heater 1550 forming heated vapor stream 1515.

In some embodiments, not all of the heated vapor stream 1515 is mixed with the bottom stream 1510. In this case, the heated stream 1515 is split into a first portion 1555 and second portion 1565. The first portion 1555 is returned to the column 1505 at a point above where the bottom stream 1510 is removed. The second portion 1565 is mixed with the bottom stream 1510.

The liquid stream 1545 from the two phase separator 1535 is returned to the column 1505 at a point above where the bottom stream 1510 is removed.

The process variations downstream of the two phase separator shown in FIGS. 2-7 could be utilized with this embodiment as well.

Specific Embodiments

While the following is described in conjunction with specific embodiments, it will be understood that this description is intended to illustrate and not limit the scope of the preceding description and the appended claims.

A first embodiment of the invention is a process for preheating a bottom or side draw stream from a column comprising heat exchanging a column bottom or side draw stream with a vapor stream from a two phase separator in a heat exchanger forming a preheated column bottom or side draw stream and a cooled stream; heating the preheated column bottom or side draw stream in a fired heater forming a heated column bottom or side draw stream comprising a mixture of liquid and vapor; separating the heated column bottom or side draw stream in the two phase separator into the vapor stream and a liquid stream; combining the cooled stream from the heat exchanger and the liquid stream from the two phase separator forming a combined mixed stream; and introducing the combined mixed stream to the column at a point above an outlet of the column bottom or side draw stream. An embodiment of the invention is one, any or all of prior embodiments in this paragraph up through the first embodiment in this paragraph further comprising heating the vapor stream from the two phase separator forming a heated vapor stream; and wherein heat exchanging the column bottom or side draw stream with the vapor stream from the two phase separator comprises heat exchanging the column bottom or side draw stream with the heated vapor stream. An embodiment of the invention is one, any or all of prior embodiments in this paragraph up through the first embodiment in this paragraph wherein the column is in a hydrotreating process, a reforming process, an isomerization process, hydroprocessing process, a hydrocracking process, a low sulfur processing process, a process for production of renewable diesel and jet fuel, a dehydrogenation process, a xylene fractionation process, an aromatics separation process, a transalkylation process, or combinations thereof. An embodiment of the invention is one, any or all of prior embodiments in this paragraph up through the first embodiment in this paragraph further comprising splitting the vapor stream from the two phase separator into a first part and a second part before; heating the first part of the vapor stream from the two phase separator forming a heated first part; wherein heat exchanging the column bottom or side draw stream with the vapor stream from the two phase separator comprises heat exchanging the column bottom or side draw stream with the heated first part; and combining the second part of the vapor stream from the two phase separator with the combined mixed stream. An embodiment of the invention is one, any or all of prior embodiments in this paragraph up through the first embodiment in this paragraph further comprising heating the second part the vapor stream from the two phase separator to form a second heated part; heat exchanging a process stream with the heated second part in a second heat exchanger to form a heated process stream and a cooled second part; combining the cooled second part with the combined mixed stream. An embodiment of the invention is one, any or all of prior embodiments in this paragraph up through the first embodiment in this paragraph further comprising heating the vapor stream from the two phase separator forming a heated vapor stream; splitting the heated vapor stream into a first part and a second part; wherein heat exchanging the column bottom or side draw stream with the vapor stream from the two phase separator comprises heat exchanging the column bottom or side draw stream with the first part of the heated vapor stream; heating the second part of the heated vapor stream forming a heated second part; heat exchanging a process stream with the heated second part in a second heat exchanger to form a heated process stream and a cooled second part; combining the cooled second part with the combined mixed stream. An embodiment of the invention is one, any or all of prior embodiments in this paragraph up through the first embodiment in this paragraph wherein the column is a naphtha stripper column, wherein the process stream comprises naphtha feed stream, and further comprising passing the heated naphtha feed stream to a fired heater for a naphtha hydrotreater. An embodiment of the invention is one, any or all of prior embodiments in this paragraph up through the first embodiment in this paragraph further comprising splitting the vapor stream from the two phase separator into a first part and a second part; heating the first part of the vapor stream from the two phase separator forming a heated first part; wherein heat exchanging the column bottom or side draw stream with the vapor stream from the two phase separator comprises heat exchanging the column bottom or side draw stream with the heated first part; heating the second part of the vapor stream forming a heated second part; heat exchanging a process stream with the heated second part in a second heat exchanger to form a heated process stream and a cooled second part; combining the cooled second part with the combined mixed stream. An embodiment of the invention is one, any or all of prior embodiments in this paragraph up through the first embodiment in this paragraph further comprising splitting the vapor stream from the two phase separator into a first part and a second part; heating the first part of the vapor stream from the two phase separator forming a heated first part; wherein heat exchanging the column bottom or side draw stream with the vapor stream from the two phase separator comprises heat exchanging the column bottom or side draw stream with the heated first part; splitting the second part into a first fraction and a second fraction; heating a process stream with the first fraction forming a heated process stream and a cooled first fraction; cooling the second fraction with a cool sink forming a cooled second fraction; and combining the cooled second fraction with the combined mixed stream. An embodiment of the invention is one, any or all of prior embodiments in this paragraph up through the first embodiment in this paragraph further comprising cooling the first fraction with a second cool sink forming a cooled first fraction; and combining the cooled first fraction with the combined mixed stream. An embodiment of the invention is one, any or all of prior embodiments in this paragraph up through the first embodiment in this paragraph further comprising splitting the vapor stream from the two phase separator into a first portion and a second portion; splitting the second portion of the vapor stream from the two phase separator into a first part and a second part; heating the first part of the second portion of the vapor stream forming a heated first part; heat exchanging the heated first part with a first process stream forming a heated first process stream and a cooled first part; heating the second part of the second portion of the vapor stream forming a heated second part; heat exchanging the heated second part with a second process stream forming a heated second process stream and a cooled second part; combining the first portion of the vapor stream from the two phase separator with the cooled first part and the cooled second part forming a combined vapor stream; and wherein heat exchanging the column bottom or side draw stream with the vapor stream comprises heat exchanging the column bottom stream with the combined vapor stream. An embodiment of the invention is one, any or all of prior embodiments in this paragraph up through the first embodiment in this paragraph wherein the first process stream comprises an aromatic transalkylation feed stream from a transalkylation feed heat exchanger, and wherein heat exchanging the heated first part with the first process stream forming the heated first process stream and the cooled first part comprises heat exchanging the heated first part with the aromatic transalkylation feedstream forming the heated aromatic transalkylation feedstream and a cooled first part, the process further comprising passing the heated aromatic transalkylation feed stream to an aromatic transalkylation reaction zone comprising an aromatic transalkylation reactor. An embodiment of the invention is one, any or all of prior embodiments in this paragraph up through the first embodiment in this paragraph wherein the second process stream comprises a xylene isomerization feed stream from a xylene isomerization heat exchanger, and wherein heat exchanging the heated second part with the second process stream forming the heated second process stream and the cooled second part comprises heat exchanging the heated second part with the xylene isomerization feed stream forming a heated xylene isomerization feedstream and the cooled second part, further comprising passing the heated xylene isomerization feed stream to a xylene isomerization reaction zone comprising a xylene isomerization reactor. An embodiment of the invention is one, any or all of prior embodiments in this paragraph up through the first embodiment in this paragraph wherein the preheated column bottom or side draw stream comprises a liquid or a mixture of liquid and vapor. An embodiment of the invention is one, any or all of prior embodiments in this paragraph up through the first embodiment in this paragraph wherein the cooled vapor stream comprises a vapor or a mixture of vapor and liquid.

A second embodiment of the invention is a process for preheating a bottom or side draw stream from a column comprising mixing a column bottom or side draw stream with a heated vapor stream from a two phase separator forming a two phase stream; heating the two phase stream in a fired heater forming a heated two phase stream; separating the heated two phase stream in the two phase separator into a vapor stream and a liquid stream; heating the vapor stream to form the heated vapor stream; and introducing the liquid stream to the column at a point above an outlet of the column bottom or side draw stream.

A third embodiment of the invention is an apparatus comprising a column having an inlet and a bottom or side draw outlet; a heat exchanger having a first inlet, a first outlet, a second inlet, and a second outlet, the first inlet being in downstream fluid communication with the bottom or side draw outlet of the column; a fired heater having an inlet and an outlet, the inlet of the fired heater being in downstream fluid communication with the first outlet of the heat exchanger; a two phase separator having an inlet, a vapor outlet, and a liquid outlet, the inlet being in downstream fluid communication with the outlet of the fired heater, the second inlet of the heat exchanger being in downstream fluid communication with the vapor outlet of the two phase separator; a first manifold having a first inlet, a second inlet and an outlet, the first inlet of the mixing connector being in downstream fluid communication with the second outlet of the heat exchanger, and the second inlet of the first manifold being in downstream fluid communication with the liquid outlet of the two phase separator; the inlet of the column being in downstream fluid communication with the outlet of the first manifold; a heater or heat source in thermal communication with a line between the vapor outlet of two phase separator and the second inlet of the heat exchanger. An embodiment of the invention is one, any or all of prior embodiments in this paragraph up through the third embodiment in this paragraph further comprising a second manifold having an inlet, a first outlet, and a second outlet, the inlet of the second manifold being in downstream fluid connection with the vapor outlet of the two phase separator, the second inlet being in downstream fluid communication with the first outlet of the second manifold, and wherein the first manifold has a third inlet in downstream fluid communication with the second outlet of the second manifold. An embodiment of the invention is one, any or all of prior embodiments in this paragraph up through the third embodiment in this paragraph further comprising a second heater or heat source in thermal communication with a line between the second outlet of the second manifold and the third inlet of the first manifold. An embodiment of the invention is one, any or all of prior embodiments in this paragraph up through the third embodiment in this paragraph further comprising a second heat exchanger having a first inlet, a first outlet, a second inlet, and a second outlet, the first inlet of the second heat exchanger being in downstream fluid communication with the second outlet of the second manifold, the third inlet of the first manifold being in downstream fluid communication with the first outlet of the second heat exchanger, the second inlet of the second heat exchanger being in downstream fluid communication with an outlet of a process, an inlet of a second process being in downstream fluid communication the second outlet of the second heat exchanger.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

What is claimed is:

1. A process for preheating a bottom or side draw stream from a column comprising:
   heat exchanging a column bottom or side draw stream with a vapor stream from a two phase separator in a heat exchanger forming a preheated column bottom or side draw stream and a cooled stream;
   heating the preheated column bottom or side draw stream in a fired heater forming a heated column bottom or side draw stream comprising a mixture of liquid and vapor;
   separating the heated column bottom or side draw stream in the two phase separator into the vapor stream and a liquid stream;
   combining the cooled stream from the heat exchanger and the liquid stream from the two phase separator forming a combined mixed stream; and
   introducing the combined mixed stream to the column at a point above an outlet of the column bottom or side draw stream.

2. The process of claim 1 further comprising:
   heating the vapor stream from the two phase separator forming a heated vapor stream; and
   wherein heat exchanging the column bottom or side draw stream with the vapor stream from the two phase separator comprises heat exchanging the column bottom or side draw stream with the heated vapor stream.

3. The process of claim 1 wherein the column is in a hydrotreating process, a reforming process, an isomerization process, hydroprocessing process, a hydrocracking process, a low sulfur processing process, a process for production of renewable diesel and jet fuel, a dehydrogenation process, a xylene fractionation process, an aromatics separation process, a transalkylation process, or combinations thereof.

4. The process of claim 1 further comprising:
splitting the vapor stream from the two phase separator into a first part and a second part before;
heating the first part of the vapor stream from the two phase separator forming a heated first part;
wherein heat exchanging the column bottom or side draw stream with the vapor stream from the two phase separator comprises heat exchanging the column bottom or side draw stream with the heated first part; and
combining the second part of the vapor stream from the two phase separator with the combined mixed stream.

5. The process of claim 4 further comprising:
heating the second part the vapor stream from the two phase separator to form a second heated part;
heat exchanging a process stream with the heated second part in a second heat exchanger to form a heated process stream and a cooled second part; and
combining the cooled second part with the combined mixed stream.

6. The process of claim 1 further comprising:
heating the vapor stream from the two phase separator forming a heated vapor stream;
splitting the heated vapor stream into a first part and a second part;
wherein heat exchanging the column bottom or side draw stream with the vapor stream from the two phase separator comprises heat exchanging the column bottom or side draw stream with the first part of the heated vapor stream;
heating the second part of the heated vapor stream forming a heated second part;
heat exchanging a process stream with the heated second part in a second heat exchanger to form a heated process stream and a cooled second part; and
combining the cooled second part with the combined mixed stream.

7. The process of claim 6 wherein the column is a naphtha stripper column, wherein the process stream comprises naphtha feed stream, and further comprising:
passing the heated naphtha feed stream to a fired heater for a naphtha hydrotreater.

8. The process of claim 1 further comprising:
splitting the vapor stream from the two phase separator into a first part and a second part;
heating the first part of the vapor stream from the two phase separator forming a heated first part;
wherein heat exchanging the column bottom or side draw stream with the vapor stream from the two phase separator comprises heat exchanging the column bottom or side draw stream with the heated first part;
heating the second part of the vapor stream forming a heated second part;
heat exchanging a process stream with the heated second part in a second heat exchanger to form a heated process stream and a cooled second part; and
combining the cooled second part with the combined mixed stream.

9. The process of claim 1 further comprising:
splitting the vapor stream from the two phase separator into a first part and a second part;
heating the first part of the vapor stream from the two phase separator forming a heated first part;
wherein heat exchanging the column bottom or side draw stream with the vapor stream from the two phase separator comprises heat exchanging the column bottom or side draw stream with the heated first part;
splitting the second part into a first fraction and a second fraction;
heating a process stream with the first fraction forming a heated process stream and a cooled first fraction;
cooling the second fraction with a cool sink forming a cooled second fraction; and
combining the cooled second fraction with the combined mixed stream.

10. The process of claim 9 further comprising:
cooling the first fraction with a second cool sink forming a cooled first fraction; and
combining the cooled first fraction with the combined mixed stream.

11. The process of claim 1 further comprising:
splitting the vapor stream from the two phase separator into a first portion and a second portion;
splitting the second portion of the vapor stream from the two phase separator into a first part and a second part;
heating the first part of the second portion of the vapor stream forming a heated first part;
heat exchanging the heated first part with a first process stream forming a heated first process stream and a cooled first part;
heating the second part of the second portion of the vapor stream forming a heated second part;
heat exchanging the heated second part with a second process stream forming a heated second process stream and a cooled second part;
combining the first portion of the vapor stream from the two phase separator with the cooled first part and the cooled second part forming a combined vapor stream; and
wherein heat exchanging the column bottom or side draw stream with the vapor stream comprises heat exchanging the column bottom stream with the combined vapor stream.

12. The process of claim 11 wherein the first process stream comprises an aromatic transalkylation feed stream from a transalkylation feed heat exchanger, and wherein heat exchanging the heated first part with the first process stream forming the heated first process stream and the cooled first part comprises heat exchanging the heated first part with the aromatic transalkylation feedstream forming the heated aromatic transalkylation feedstream and a cooled first part, the process further comprising:
passing the heated aromatic transalkylation feed stream to an aromatic transalkylation reaction zone comprising an aromatic transalkylation reactor.

13. The process of claim 11 wherein the second process stream comprises a xylene isomerization feed stream from a xylene isomerization heat exchanger, and wherein heat exchanging the heated second part with the second process stream forming the heated second process stream and the cooled second part comprises heat exchanging the heated second part with the xylene isomerization feed stream forming a heated xylene isomerization feedstream and the cooled second part, further comprising:
passing the heated xylene isomerization feed stream to a xylene isomerization reaction zone comprising a xylene isomerization reactor.

14. The process of claim 1 wherein the preheated column bottom or side draw stream comprises a liquid or a mixture of liquid and vapor.

15. The process of claim 1 wherein the cooled vapor stream comprises a vapor or a mixture of vapor and liquid.

* * * * *